United States Patent
Faccin et al.

(10) Patent No.: US 6,879,690 B2
(45) Date of Patent: Apr. 12, 2005

(54) METHOD AND SYSTEM FOR DELEGATION OF SECURITY PROCEDURES TO A VISITED DOMAIN

(75) Inventors: Stefano Faccin, Dallas, TX (US); Franck Le, Irving, TX (US)

(73) Assignee: Nokia Corporation, Espoo (FI)

(*) Notice: Subject to any disclaimer, the term of this patent is extended or adjusted under 35 U.S.C. 154(b) by 459 days.

(21) Appl. No.: 09/990,329

(22) Filed: Nov. 23, 2001

(65) Prior Publication Data

US 2002/0114469 A1 Aug. 22, 2002

Related U.S. Application Data

(60) Provisional application No. 60/269,956, filed on Feb. 21, 2001.

(51) Int. Cl.[7] .............................. H04K 1/00; H04L 9/00
(52) U.S. Cl. ........................ 380/247; 380/270; 380/44; 713/168
(58) Field of Search .............................. 380/247, 255, 380/259–260, 262, 270, 277–279, 44–46, 28; 713/168, 171, 200–201; 455/410–411, 422.1, 432.1, 436

(56) References Cited

U.S. PATENT DOCUMENTS

| | | | | |
|---|---|---|---|---|
| 5,091,942 A | * | 2/1992 | Dent ............................ | 380/46 |
| 5,668,875 A | * | 9/1997 | Brown et al. ................ | 380/248 |
| 6,522,880 B1 | * | 2/2003 | Verma et al. ................ | 455/436 |

OTHER PUBLICATIONS

Bruce Schneier, Applied Cryptography, second edition,,John Wiley and Sons,Inc.,pp. 33–34, 180, Oct. 1995.*

* cited by examiner

*Primary Examiner*—Hosuk Song
(74) *Attorney, Agent, or Firm*—Antonelli, Terry, Stout & Kraus, LLP

(57) ABSTRACT

A method and system for delegation of security procedures to a second domain. A first key is generated for a mobile node. The first key is stored at the mobile node and at a home domain of the mobile node. The mobile node is moved to the second domain. A request is sent from the second domain to the home domain to authenticate the mobile node. A second key is generated at the home domain using the first key and a random number. The random number and the second key are sent to the second domain. The random number is sent to the mobile node by the second domain. The mobile node generates the second key using the random number and the first key. The second key is used for authentication procedures and/or key derivation procedures between the mobile node and the second domain.

44 Claims, 5 Drawing Sheets

METHOD AND SYSTEM FOR DELEGATION OF SECURITY PROCEDURES TO A VISITED DOMAIN

This application claims the benefit of U.S. Provisional Patent Application No. 60/269,956, filed Feb. 21, 2001, the contents of which is incorporated by reference herein in its entirety.

BACKGROUND

1. Field of the Invention

This invention relates to roaming mobile nodes in a visited domain, and more specifically to delegating security procedures, such as authentication and key distribution, to the visited domain.

2. Discussion of the Related Art

Mobile devices such as cellular phones, Personal Digital Assistants (PDA), laptop computers, etc. are abundant in today's society. A large number of people carry mobile phones daily as they travel from home to work and to other places during their day. In most cases, the mobile device has a subscription with a home domain. This home domain keeps information about the user such as the long term key for security procedures but also information regarding the services the user has subscribed and is therefore authorized to have access to, etc.

When a mobile device/node roams to a foreign domain (i.e., visited domain), the user of the mobile node needs to be authorized by the foreign domain to gain access to local resources of the visited domain. The authorization generally consists of the user offering his/her credentials to a local agent (e.g., a local Authentication Authorization and Accounting (AAA) client) in order to verify that the user is authorized (e.g., by roaming agreement between the home domain and visited domain (e.g., Internet Service Providers (ISPs))) and to authenticate the user.

In addition, when a user/mobile node is roaming, many security associations (SAs) usually need to be set up between the user and agents or entities of the visited domain. For example, a security association may be needed between the user and the access router in a visited domain to protect data (confidentiality and integrity protection) over the access link. As another example, in the context of Mobile Internet Protocol (MIP), an SA may be needed between the mobile node (MN) and the home agent when this one is assigned in the visited domain. As a third example, a security association may also be required between the mobile node and mobility agents when a Localized Mobility Management solution is deployed. These security associations typically have a restricted lifetime, and when expired, they need to be refreshed. In addition, in order to avoid fraud, service providers need the ability to force a user to provide authentication information anytime during a session. Both the home domain service provider and the visited domain service provider need to have this capability.

Moreover, to achieve better overall security, a mobile node may want to challenge the network at any time, for example to avoid network impersonation attacks, man in the middle attacks, etc. All these procedures require the involvement of the home AAA server (AAAh), since only the user/mobile node and its home domain share a long-term key. This implies that several message round trips are needed between a visited domain and a home domain in order to support the above-mentioned authorization/authentication and key distribution procedures. These message exchanges between the home domain network and visited domain network may create an excessive signaling load between the AAAh and visited AAA server (AAAv,) and also may add delay in the procedure.

Therefore, a need exists for method and apparatus that allows a user/mobile node and a visited network to perform authentication and key distribution procedures without requiring many round trip communications between the visited network and the home domain network of the user, and that provides a local security association (LSA) that allows for optimizations and empowers a visited network to authenticate a user at any time, as well as empowers the user to authenticate the network at any time, and performs key distribution procedures without the involvement of the home domain, while still maintaining a good level of security.

SUMMARY

The present invention relates to a method for delegation of security procedures to a second domain. A first key is generated for a mobile node. The first key is stored at the mobile node and at a home domain of the mobile node. The mobile node is moved to the second domain. A request is sent from the second domain to the home domain to authenticate the mobile node. A second key is generated at the home domain using the first key and a random number and the random number and the second key are sent to the second domain. The random number is sent to the mobile node by the second domain. The mobile node generates the second key using the random number and the first key. The second key is used for at least one authentication procedure between the mobile node and the second domain.

A network authentication request may be generated by the mobile node and sent to the second domain. The second domain may generate a first authentication response using the third key and the network authentication request. The network authentication response may be sent to the mobile node. The mobile node may generate the third key using the first key and the second random number. The mobile node may generate a second authentication response using the third key and the network authentication request. The second domain generated first authentication response and the mobile node generated second authentication response may be compared. The mobile node may authenticate the second domain if the second authentication response and the first authentication response compare. The second domain may be notified that the second key has been updated with the third key if the first authentication response and second authentication response compare. The second domain may use the third key for the authentication procedures between the mobile node and the second domain.

The second domain may generate a third random number and send the third random number to the mobile node. The mobile node may generate second authentication data using the third random number and the third key. The second authentication data may be sent to the second domain. The second domain may use the second authentication data to verify that the mobile node has updated the second key with the third key.

The present invention is also related to a method for delegation of security procedures to a second domain where a first key is shared with a mobile node and at least one server in the home domain of the mobile node. The mobile node is moved into the second domain. Authentication of the mobile node by the home domain is requested. A second key is generated using the first key in the home domain. The second key is sent to the second domain. The second key is used for at least one authentication procedure between the mobile node and the second domain.

Moreover, the present invention is related to a system for delegation of security procedures to a second domain. The system includes a home domain, a mobile device, and the second domain. The home domain contains at least one server. The mobile device shares a first key with one at least one server in the home domain. The second domain contains at least one second server. A security association exists between the one at least one server in the home domain and one at least one second server in the second domain. When the mobile device roams into the second domain, the second domain requests authentication of the mobile device by the home domain. The one at least one server generates a second key using the first key and sends the second key to the second domain. The second key is used for at least one authentication procedure between the mobile device and the second domain. The second domain may be a visited domain.

The present invention is further related to a method for delegation of security procedures to a second domain that includes moving a mobile device to the second domain where the mobile node has a home domain. A second key is sent from the home domain to the second domain for authentication of the mobile device. The second key is based on a first key shared between the home domain and the mobile device. The second domain authenticates the mobile device using the second key. The second key is used for at least one authentication procedure between the mobile device and the second domain.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
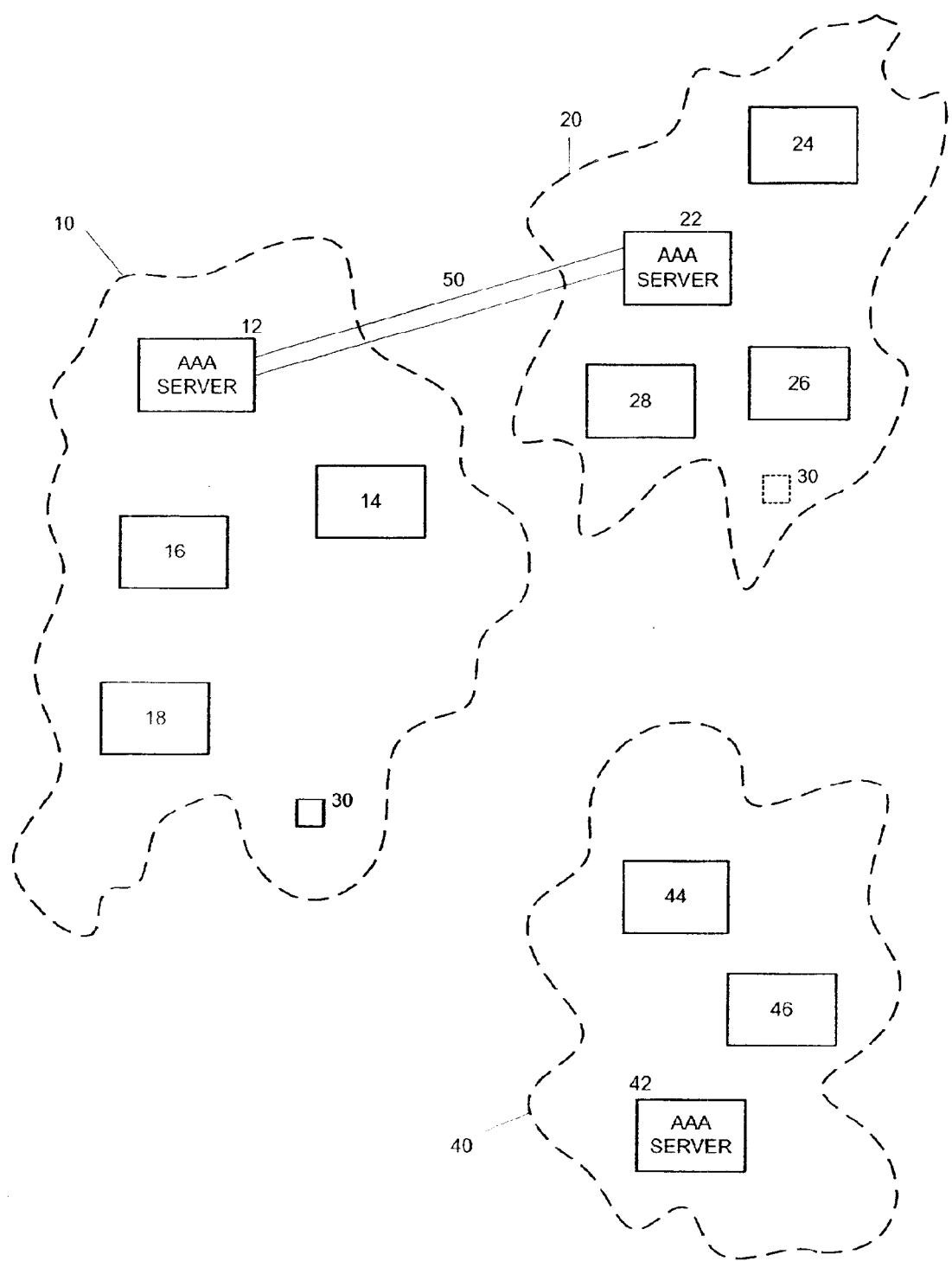
FIG. 1 is a diagram of domains with a mobile node at its home domain according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and apparatus for authentication of mobile nodes and networks, as well as key distribution without involving the home network that relates to setting up a local security association (LSA) between a user (i.e., mobile node) and a visited domain/network when the user/mobile node has roamed from its home domain to the visited domain. A long-term key shared between a mobile node and its home domain may be used to generate a temporary shared key (TSK) that may then be used for authentication and key generation purposes between the visited domain and the mobile node without any further involvement of the home domain. The terms "user" and "mobile node" may be used interchangeably in illustrating the present invention and refer to the device that shares the long-term key with the home domain.

Therefore, according to the present invention, once a TSK is established between a user and a visited domain (with the involvement of the home domain), functions such as entity authentication and key derivation may be delegated to the visited domain. These functions are performed securely because the user-specific temporary shared key was created under the control of the home domain and securely distributed to the visited domain and to the user/mobile node. Therefore, the home domain needs not be involved in any future authentication or key derivation procedures involving the visited domain and the mobile node.

FIG. 1 shows a diagram of domains with a mobile node at its home domain according to an example embodiment of the present invention. FIG. 1 shows three domains 10, 20 and 40. Each domain represents a specific network operated by an Internet Service Provider (ISP). For example, domain 10 may be operated by ISP 1, domain 20 may be operated by ISP 2, and domain 40 may be operated by ISP 4. Each domain 10, 20, 40 may include an Authentication, Authorization and Accounting (AAA) infrastructure composed of AAA servers and AAA clients (12, 22 and 42). Each domain may also include one or more other network nodes or entities that may perform various functions in the domain. Domain 10 includes entities 14–18, domain 20 includes entities 24–28, and domain 40 includes entities 44 and 46. These entities may be servers, routers, clients, agents, etc. There may be multiple users with mobile devices (i.e., mobile nodes), based in each particular domain. For example, mobile node 30 has its home domain as domain 10. An MA server in one domain may have a secure channel with AAA servers in other domains. AAA server 12 in domain 10 has a security association 50 with AAA server 22 in domain 20. Security association 50 allows a secure channel to exist for communication of sensitive information. Security association 50 may be used to transmit keys and other information across a secure interface. If user/mobile node 30 moves from domain 10 to domain 20 (user/mobile node 30 shown in dotted lines in domain 20), AAA server 22 may use security association 50 to contact AAA server 12 in order to authenticate mobile node 30 in visited domain 20.

Figure 2:
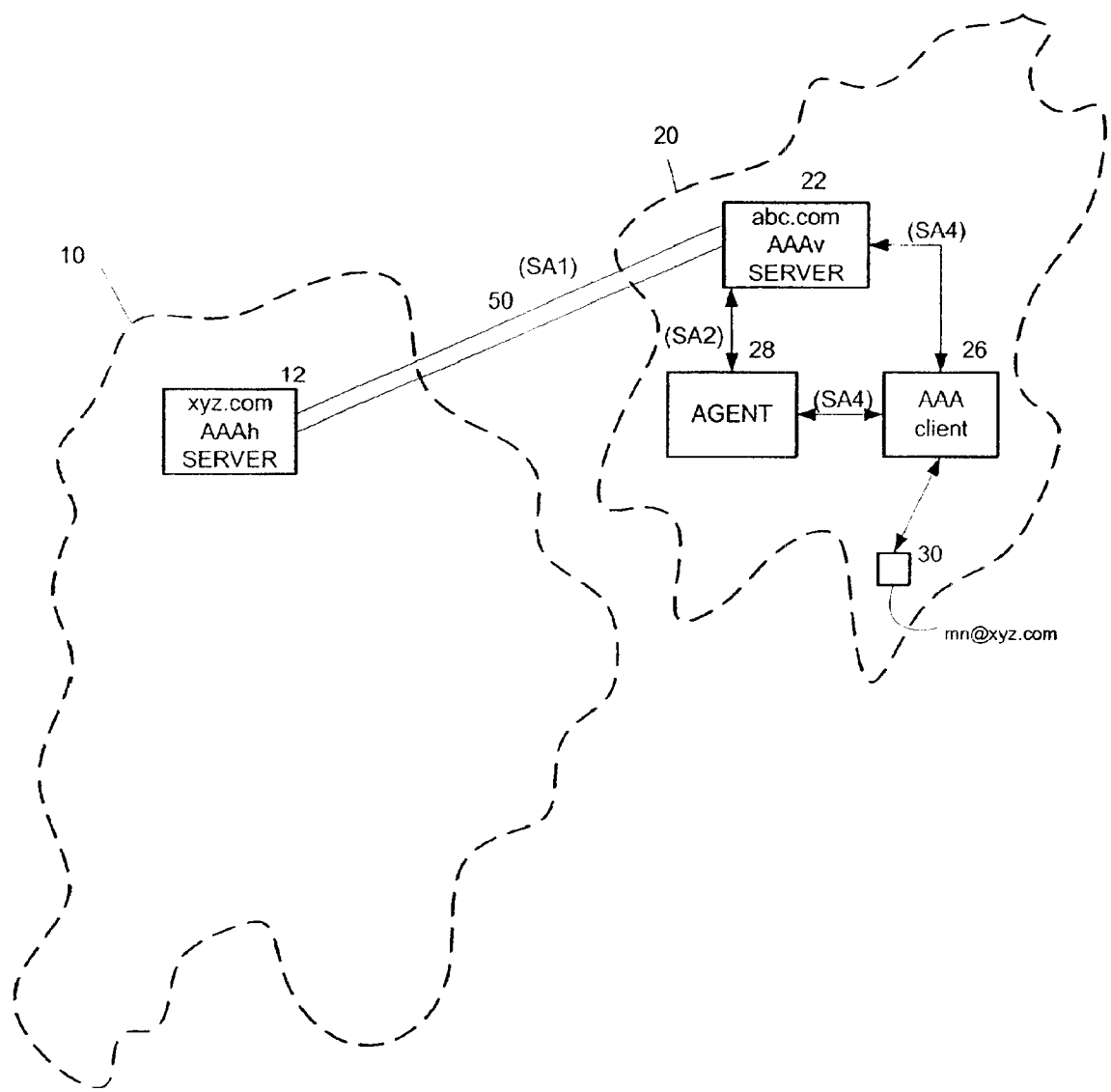
FIG. 2 is a block diagram of a temporary shared key security model according to an example embodiment of the present invention.

FIG. 2 shows a block diagram of a temporary shared key security model according to an example embodiment of the present invention. An AAA client (AAAc) 26 may perform a function that allows a user 30 to be authenticated and authorized by a visited network service provider in order to gain access to IP conductivity in the visited domain 20. The user 30 provides its identity and authentication data to the AAAc 26 in visited network 20, which then may use an AAA infrastructure to authenticate and authorize user 30 for usage of visited domain resources, and eventually transport other information. The specific details of the exchange between a user/mobile node and an AAAc of authentication data (e.g., type of data, number of exchanges, etc.) may be based on the specific authentication algorithm adopted between the two. An AAAc may be any of many types of entities, for example, an attendant (e.g., located in the default router or access router (the first router visible to the user in the visited network)), the registration agent of the visited domain, or may be any server in the visited network. The present invention may be applied to all of these cases. For the sake of illustrating the present invention, this entity will be referred to as an AAAc for the sake of generality.

An AAA infrastructure according to the present invention may be based on a network of AAA entities. AAAc represents an AAA client in a visited network 20, AAAv, represents an AAA server in the visited domain 20 while AAAh represents an AAA server in the home network 10 of mobile node 30. A number of protocols may be used that locate an agent 28 (peer-entity) in a visited domain in order to deliver data packets, or exchange protocol-specific signaling messages, with mobile node 30. Mobile IP, IP paging, and SIP (Simple Internet Protocol) are examples of such protocols. Any of these protocols may have a requirement or a recommendation to have a security key between a mobile node 30 and an agent 28. The security key may be used to authenticate and/or encrypt signaling messages exchanged between agent 28 and mobile node 30. This shared key between mobile node 30 and the agent of each protocol in visited domain 20 usually cannot be pre-established but may need to be dynamically established. Authentication may be required before the key distribution is performed.

The security model shown in FIG. 2 may be based on a set of security associations (SAs) between the entities in the model. Some of the security associations are pre-established. For example, it is assumed that the home domain and the visited domain share a long-term security association (SA1) that is not specific to any particular user/mobile node and that can be either dynamically set up or established off line as a result of a roaming agreement between the two domains/networks 10 and 20. Any mechanisms may be adopted to set up such security associations and still be within the spirit and scope of the present invention. According to the present invention, it is assumed in particular that SA1 exists between AAAh and AAAv. This security association may be used to exchange information in a secure and mutually authenticated fashion in the two networks 10, 20 by the AAA servers.

Moreover, according to the present invention, it is assumed that each network 10, 20 has its own security mechanism and security associations (SA2 and SA4) allowing entities in the same network to communicate in a secure and mutually authenticated way (e.g., using IP security (IPSEC) and a local Public Key Infrastructure (PKI)). Further, according to the present invention, it is assumed that each user/mobile node, as a result of a subscription agreement with a home domain, has a long-term security association (SA3) (not shown) with the home domain of the user. Such security association allows the mutual authentication between the mobile node and the home domain. According to the present invention, it is assumed in particular, that a mobile node and an AAA home server share a common set of algorithms and a common set of keys. These algorithms and keys may be used to authenticate the user to the home domain and the home domain to the user. In the case where multiple algorithms are available, a negotiation may need to take place between the user and the AAAh server to select one algorithm when the user is authenticated and the temporary shared key is established/refreshed. SA3 may also be used to derive other dynamic security associations.

According to the present invention, a mobile node and a visited domain have a set of common security algorithms that can be used to support adoption of a local security association between them. A local security association may not be possible if the mobile node and the visited domain do not have an algorithm in common. These algorithms may be needed for mutual authentication between a user and the visited domain, ciphering and integrity protection of messages between the user and an agent in the visited domain if such feature is required, or distribution of dynamic keys between the user and agents in the visited domain based on the local security association. One single algorithm may be used for all these functions, or a different algorithm for each one. Therefore, at least one common algorithm should be available to the user and the visited domain. Negotiation between the mobile node and the visited domain may be necessary to determine whether there is a common algorithm and what this algorithm is. For example, MD5 may be the default common algorithm used both for authentication and establishment of dynamic keys by a mobile node and visited domain.

Once a temporary shared key is established between a user and a visited domain, with the involvement of the home domain of the user, the temporary shared key may be used for: authentication of the user by the visited domain at any time, authentication of the visited domain by the user at any time, or control by the visited domain of key distribution between the user and agents/entities in the visited domain. For example, the temporary shared key may be used to set up a security key between the user and an agent in the visited domain (e.g., access router) to protect the data (e.g., encryption and integrity protection) exchanged over the access link.

Moreover, the temporary shared key may be used to set up a security key between a user and mobility agents in the visited domain. In the context of Mobile IP, if a Local Mobility Management scheme is adopted, the temporary shared key may be used to authenticate the binding update/binding acknowledgment messages.

All these functions may be performed using the temporary shared key and without the involvement of the home domain, while still being performed securely since the user-specific temporary shared key is created under the control of the home domain and securely distributed to the visited domain and to the user. The node in the visited domain to which the temporary shared key may be distributed to may be an AAAv server, or an AAA client (AAAc) such as a registration agent. Depending on the capabilities and type of the AAAc (e.g., AAAc may be a URP registration agent (RA) versus a MIPv4 foreign agent), the temporary shared key may be provided to the AAAv or to the AAAc. Therefore, depending on where the temporary shared key is distributed, the authentication and key distribution procedures based on the temporary shared key may be performed on different entities (e.g., AAAv versus AAAc) in the visited domain.

According to the present invention, a temporary shared key is an optimization to existing security procedures when considering the signaling involved between the visited and the home domain. However, whether a local security association is used (i.e., a temporary shared key is provided to the visited domain) may depend on the home network policies and roaming agreements. For example, in order to maximize the security, there may be cases in which a home domain will not be willing to share the temporary shared key with a visited domain. This may occur, for example, when the user moves to a visited domain that the home domain does not trust sufficiently. The location of a visited domain may also be a reason why a home domain is not willing to share the temporary shared key with the visited domain.

According to the present invention, extensions to the Diameter protocol may be required to support the temporary shared key mechanism. Parameters exchanged by a user and AAAc may be carried out in many ways, for example, in IPv6 destination options, in ICMPv6 messages, in URP messages, by EAP, etc. Any protocol may be used to exchange this information and still be within the spirit and scope of the present invention.

When a user moves to a new visited domain and first registers, the AAAh server of the mobile node is invoked to verify the validity of the mobile node. If the visited domain's and home domain's policies allow and suggest the use of the temporary shared key, certain processes may occur. For example, the home domain may generated a new temporary shared key if no temporary shared key had been previously established and distributed to the visited domain. The temporary shared key may be updated if the temporary shared key previously established and distributed to the user and visited domain has expired (e.g., limited lifetime of TSK) or the temporary shared key was previously used in a different visited domain and for the sake of security it is the policy of the home domain to generate a new temporary shared key.

Thus, the temporary shared key may be distributed to the user and to the visited domain in the case where the temporary shared key is generated/updated, and in the case where a previous value of a temporary shared key is used. In the latter scenario, the temporary shared key need only be distributed to the visited domain, since the user already has it. The user needs to be informed that the previous temporary shared key is still valid.

Preferably, an AAAh updates the temporary shared key at least every time a mobile node enters a new visited domain, otherwise, the previous visited domain has the value of the temporary shared key and could act on behalf of the user/mobile node and carry out undesirable actions. The network policies may determine whether this process is followed.

Figure 3:
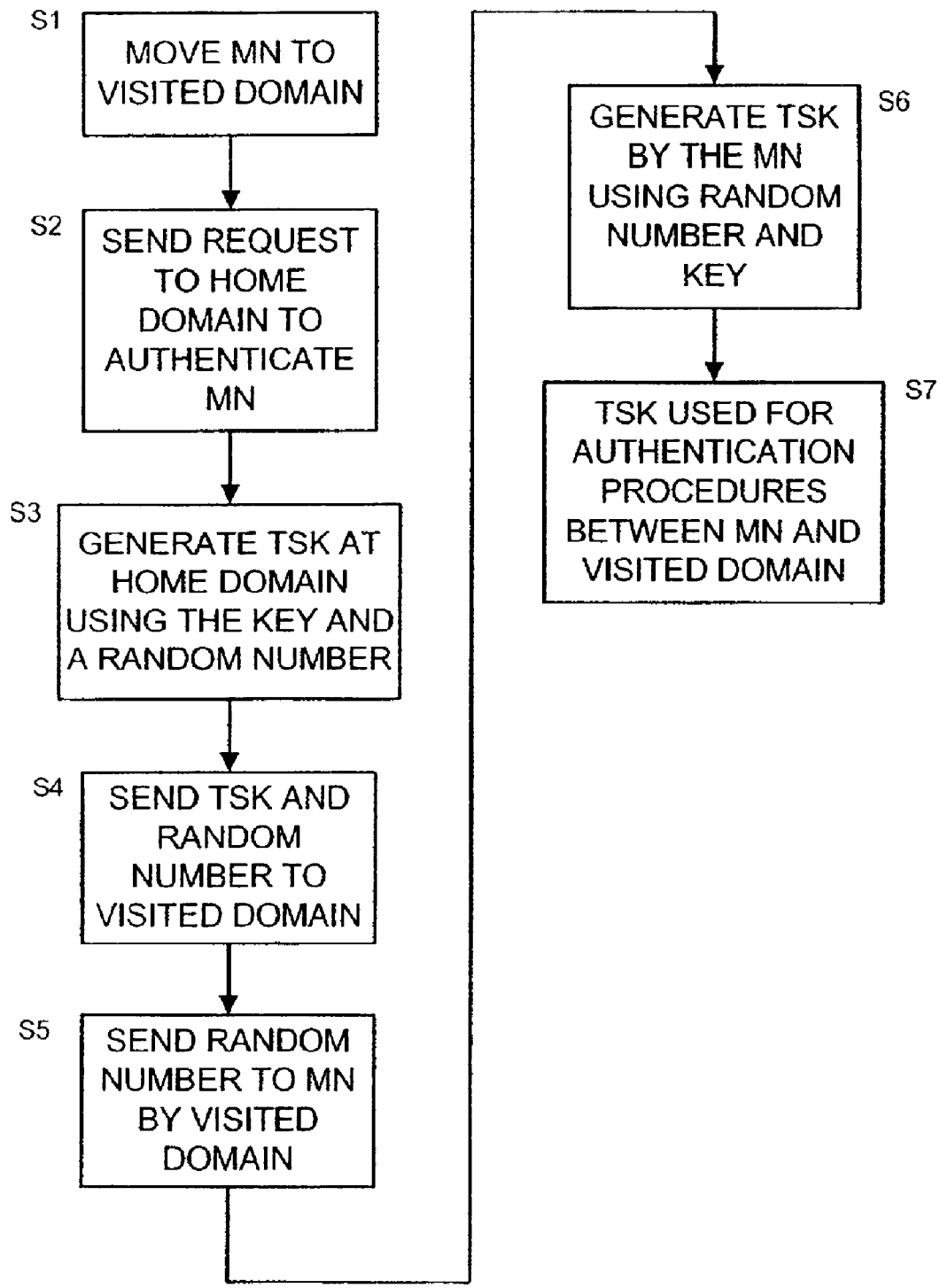
FIG. 3 is a flowchart of a process for creation and distribution of a temporary shared key according to an example embodiment of the present invention.

FIG. 3 shows a flowchart of a process for creation and distribution of a temporary shared key according to an example embodiment of the present invention. As previously described, a long-term key is shared between the Mobile Node and its Home Domain: it is e.g. configured at the time of subscription. The long-term key is stored at the mobile node and at the home domain. When the mobile node moves to a visited domain S1, the visited domain sends a request to the home domain of the mobile node to authenticate the mobile node S2. After the user is authenticated, and if the home and visited domains decide to use the Temporary Shared Key, a temporary shared key is generated at the home domain using the long-term key and a random number S3. The home domain may also use other information along with the long-term key to generate the temporary shared key. The temporary shared key and the random number (and possibly other information) is sent to the visited domain by the home domain S4. The random number is sent to the mobile node by the visited domain S5. The mobile node generates the temporary shared key using the random number and the long-term key S6. The TSK is used for authentication procedures between the mobile node and the visited domain S7.

The example embodiment in FIG. 3 is just one of many possible ways to generate and distribute the Temporary shared key in the same time the network authenticates the user and the user authenticates the network. The procedure used to create the temporary shared key is independent of the authentication mechanism used to authenticate the user/mobile node. Different EAP types or protocols may be adopted for authentication. The visited domain has the temporary shared key and can use the temporary shared key in any way it sees fit to authenticate the mobile node.

Figure 4:
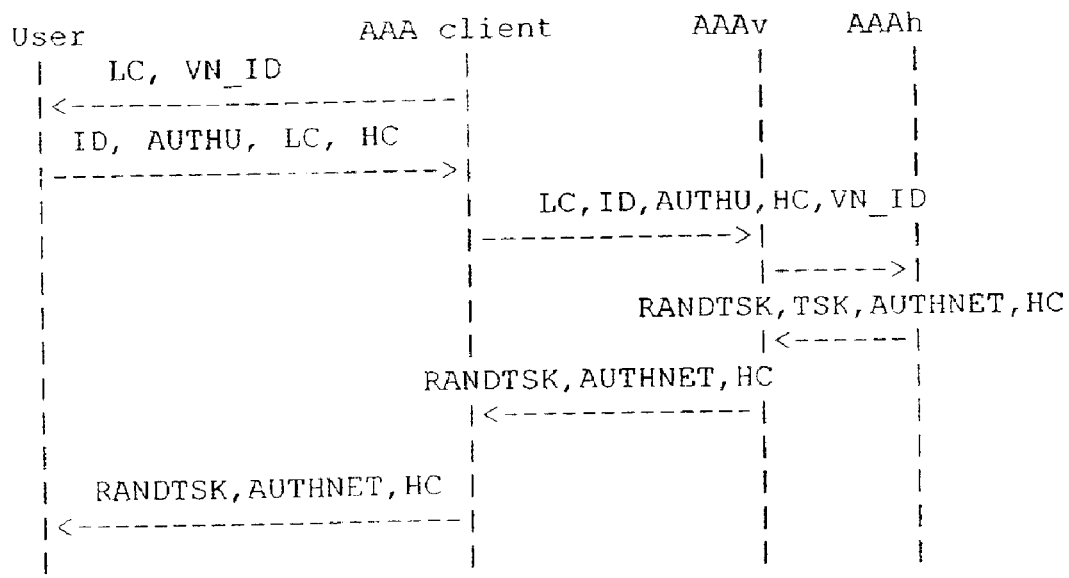
FIG. 4 is a diagram of message flow during TSK generation and distribution when a mutual authentication occurs according to an example embodiment of the present invention.

FIG. 4 describes in more details how the TSK generation and distribution is combined with the user/network authentication when the user first registers in the visited domain and when the authentication mechanism is based on Challenge-response. In this example embodiment, the visited domain broadcasts a Local challenge and the user uses this local challenge (LC), a visited network identifier (VN_ID), and the long-term key to compute some authentication data (AUTHU). The user may also generate a host challenge (HC) to require network authentication. The user sends the user ID (ID), (i.e., mobile node ID), AUTHU, LC, and HC to the AAA client. The AAA client then forwards this information to the AAAv including the local challenge and the visited network ID. The AAAv forwards the message(s) containing the information to the AAAh. From the local challenge, the visited network ID, and the user specific shared long-term key retrieved thanks to the user/mobile node ID (e.g., the Network Access Identifier), the AAAh verifies the validity of the user. The AAAh then computes the network authentication data (AUTHNET) from the host challenge and the long-term key, and eventually generates some keying material if the AAA servers are requested to play a role in the key distribution. If the AAAh and AAAv decide to use the temporary shared key, the AAAh generates a new random number (RANDTSK) and executes the algorithm shared with the mobile node using the long term key (SA3) to compute the new "pending" temporary shared key (TSK). The RANDTSK, TSK, AUTHNET, and HC are sent from the AAAh to the AAAv. The AAAv forwards the RANDTSK, AUTHNET, and HC to the AAA client, who then forwards this information to the mobile node.

The TSK-AVP may be sent in any already defined command code such as the Diameter-EAP-answer (DEA) command or the AAA-mobile-node-answer (AMA) command. This AVP will carry the pending TSK to the visited domain (AAAv) and, therefore, the messages should be protected under an AAA security association between the AAAh and the AAAv. The RANDTSK may be sent in a RANDTSK-AVP, in the same way as the TSK-AVP, i.e., in any already defined command code such as the Diameter-EAP-answer command or the AAA-mobile-node-answer command. The user will use the RANDTSK to derive the corresponding TSK. The AAAc, therefore, converts the RANDTSK-AVP to the appropriate protocol to send to the user. The RANDTSK may be sent to the user in any protocol and still be within the spirit and scope of the present invention, for example, in a destination option, Internet Control Message Protocol (ICMP)v6 message, URP protocol, etc.

The AAAh may use inter AAA servers security to protect the message to the AAAv. The mobile node verifies the authenticity of the network thanks to the network authentication data (AUTHNET) computed from the host challenge (HC). If RANDTSK is provided to the mobile node, the mobile node derives, from the long-term key and the common algorithm shared with its AAAh server, the corresponding TSK to use for subsequent entity authentication and key distribution procedures. The user receives the RANDTSK in the message carrying the network authentication data and can, therefore, be sure that the information is coming from its home network.

The home network must also be able to update the TSK at any time when the mobile node is in a visited domain and the TSK is shared. For example, the TSK may get corrupted and the home network must be able to revoke the TSK by performing a new TSK update. A temporary shared key update function according to the present invention relates to the process by which the current TSK used by a user in the visited domain is changed to a new value under the direction of the AAAh. This process also applies to the scenario where a user and a visited domain do not share a TSK and a new TSK needs to be generated. It may be desired that only the AAAh may initiate the update of the current value of TSK. The AAAh may do this at any time during a session according to the home domain policies.

On the network side (i.e., visited domain side) a user authentication process may be executed immediately after a TSK update to confirm that the target user/mobile node has successfully changed its TSK. This process may occur by the visited network sending a challenge to the mobile node. Based on the expected received authentication data from the mobile node (in response to the challenge) that must be from using the new TSK, the visited network can insure that the TSK update has been successful and that the user has, and is using, the new TSK value. This ensures that the user can authenticate itself and the visited network in the future.

On the user's side (i.e., mobile node side) the user may initiate a network authentication procedure when the user is directed by a visited network to change the TSK value of the user. This authentication procedure allows the user to authenticate the visited network issuing the TSK update, thus preventing a fraudulent network from disrupting the normal network operation by forcing the user's TSK out of alignment with the legitimate visited network TSK.

The AAAh may initiate a TSK update process at any moment when the user/mobile node is in a visited domain and is sharing a TSK. The decision on when the TSK is updated may be based on home domain policies. Preferably, the TSK is not changed too often otherwise the benefits of a TSK disappear. However, the TSK must have a lifetime to ensure that the same TSK is not used for too long.

To update the TSK, the AAAh first generates a random number RANDTSK; and then executes the algorithm shared with the user using the long-term key and this random number to compute the new Temporary Shared Key (TSK). The AAAh sends the RANDTSK and the new TSK to the AAAv in a RANDTSK-AVP and TSK-AVP, respectively. These AVPs may be sent in an already defined command code such as the Re-Auth-Request (RAR). The AAAh may then wait for a report from the AAAv. With the RANDTSK and the new TSK, the AAAv can update the TSK in the mobile node, respond to a network authentication request from the mobile node, and verify the update of the TSK by issuing a user specific authentication procedure to the mobile node.

Upon receiving the RANDTSK and the new TSK key, the AAAv directs the serving router to send a TSK key update order, including the RANDTSK, to the mobile node. The mobile node may respond with a network authentication request including a challenge selected by the mobile node. The AAAv executes a shared algorithm using as inputs the mobile node's challenge and the new TSK. The result of the calculation is sent to the mobile node. Depending if the parameter equals to the expected corresponding results, the mobile node indicates a successful or an unsuccessful TSK update in a message to the AAAv. If successful, the serving system (AAAV) executes the user specific authentication procedure: The serving system challenges the user by sending the user a randomly generated number to authenticate the user and make sure the user now has the correct TSK value. The user takes the random number and the newly derived TSK as inputs to a shared algorithm with the serving system and computes an authentication parameter. The AAAv performs the same steps and thus verifies that the user has updated the TSK value. Otherwise, the AAAv reports that the TSK update process has failed to the AAAh.

Figure 5:
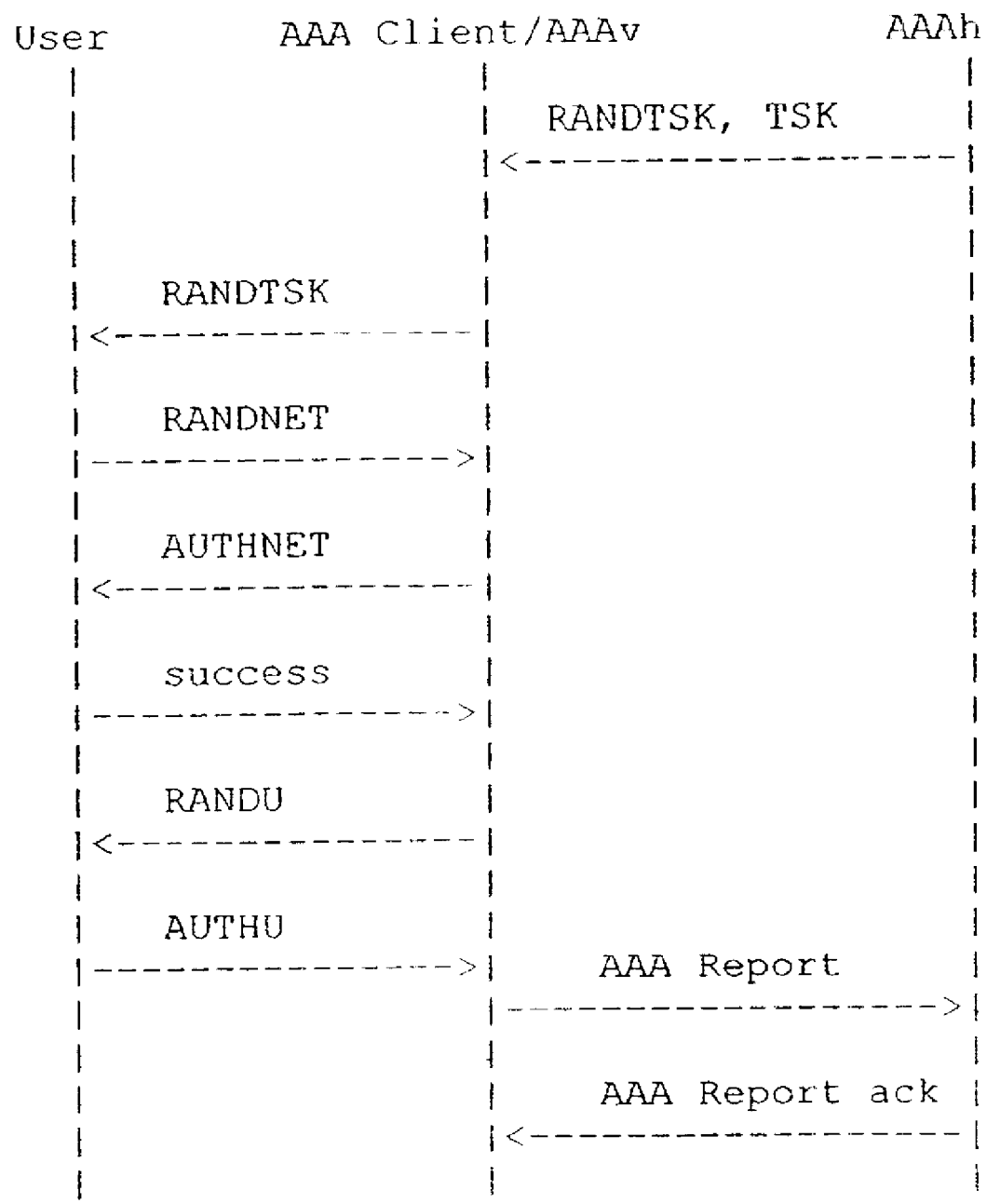
FIG. 5 is a flow diagram of a TSK update process according to an example embodiment of the present invention.

FIG. 5 is a flow diagram of a TSK update process according to an example embodiment of the present invention. A new TSK is generated at the home domain using a new random number (different from the random number used to generate the initial TSK) and the long-term key. The new random number, RANDTSK, and the new TSK are sent to the visited domain. The visited domain sends the new random number, RANDTSK, to the mobile node. The mobile node, not knowing if this TSK update process is coming from a valid network, generates a network challenge, RANDNET, to the visited domain. The visited network generates a response, AUTHNET, to the mobile node challenge using the new TSK and the challenge, RANDNET, and sends the response to the mobile node. The mobile node generates the new TSK using the long-term key and the new random number RANDTSK. The mobile node then computes the new TSK and verifies the validity of the network authentication response AUTHNET based on the new TSK, and the previously generated RANDNET. The response generated by the mobile node is compared with the response generated by the visited network. If these two responses do not compare, the visited domain is not authenticated and the new TSK is not used by the mobile node. If the responses compare, the visited domain has been authenticated and the mobile node updates the current TSK with the new TSK. Depending if AUTHNET equals to the expected corresponding result, the MN indicates a successful or an unsuccessful TSK update in a message to the AAAv. If successful, the serving system executes the user specific authentication procedure: It challenges the user sending it a randomly generated number RANDU to authenticate him and make sure the User now has the correct TSK value. The User takes RANDU and the newly derived TSK as inputs to a shared algorithm with the serving system and computes AUTHU. The AAAv performs the same steps and can thus verify that the user has updated the TSK value.

Otherwise AAAv reports the failure to the AAAh.

There may be a case where a user/mobile node and its home network already have a temporary shared key set up and want to reuse the TSK when entering into the visited domain. In this case, the TSK needs to be distributed to the visited network (from AAAh to AAAv). The TSK does not need to be sent to the user since the user already has knowledge of it. However, an indication still needs to be provided to the user to inform him to start using the TSK. This may be achieved by setting a specific value in the RANDTSK field sent to the user.

Once a TSK has been established between a mobile node and a visited domain, this enables the visited domain to perform entity authentication (user authentication and network authentication) and key distribution without involving the home network, thus reducing the time delay and signaling between the two domains. Without a TSK, the exact algorithm used to compute the authentication data depends on the security association between the user and the AAAh. Authentication data is usually computed using the long-term key shared between the user and the AAAh, plus some other information and a commonly shared algorithm. When the TSK mechanism is employed, the user takes the same inputs, but instead of using the long-term key it shares with its AAAh, the user uses the TSK it shares with the AAAv and the shared algorithm. The visited system, having the TSK and the shared algorithm, can then authenticate the user without invoking the home network of the user. The TSK can also be used by entities in the visited domain to establish session keys to be used by the entities and the user/mobile node.

The user may want to authenticate the network and thus generates a random number, a host challenge, to challenge the network. In this case, the user expects a network authentication data computed by the AAAh using the host challenge and currently, the long term shared key. The exact algorithm used to compute the network authentication data depends on the security association between the user and the AAAh. If the TSK mechanism is used, the user sends the host challenge to authenticate the network and the AAAv applies the common algorithm to the host challenge and the TSK to compute the authentication data, i.e., the network authentication data. Network authentication is thus provided without involving the AAAh.

Without the use of TSK, key distribution between a user an agents in a visited domain may be based on the long term security association between the user and its AAAh. This security association may be used to create derivative security associations between the mobile node and agents in the visited domain.

When TSK is adopted, the user may receive the indication that TSK is to be used and, therefore, the user uses the TSK instead of the long-term key to compute derivative keys. In this way, an AAAc/AAAv (depending on what agent the TSK was provided to) uses the TSK as well for the key distribution. The keys may be available to the user and to AAAc/AAAv. AAAh does not need to be involved in the procedure.

The key distribution may be based on random numbers where the AAAc/AAAv generates the random number and combines it with some other data, such as for example the user identity or IP address, to form an input along with the TSK to a key derivation algorithm. The random number may be transmitted to the user that performs the same operations, and having knowledge of the TSK, ends up with the same derived session key. Other key distribution schemes may be employed and still be within the spirit and scope of the present invention. For example, the user and agent in the visited domain may decide to set up a key based on Diffie Hellman. However, the major vulnerability of this mechanism is authentication to prevent "man in the middle" attacks. The TSK shared between the user and the visited network can provide this Diffie Hellman value authentication.

To implement the present invention, preferably specific parameter protocol AVPs are used. These AVPs can be extensions to a current Diameter Application such as the Diameter NASREQ extensions, or to the Diameter based protocol or introduced as part of a new application to the Diameter Base protocol. A new specific Diameter application could be specified with its own command codes to perform TSK update procedures and all other functions according to the present invention. Having a new application to the Diameter Base protocol allows AAA servers to identify which ones support the TSK mechanism. The present invention identifies the information exchanged over the interface, but is not dependent on any particular protocol. The information may be carried via any protocol and be within the spirit and scope of the present invention, for example, as IPv6 destination options, ICMPv6 messages, or any other methods. Some example Diameter protocol AVPs that preferably are used to implement the present invention include: RANDTSK-AVP, TSK-AVP, RANDNET-AVP, AUTHNET-AVP, RANDU-AVP, AUTHU-AVP, AAA-Report-AVP, and AAA-Report-ack-AVP.

The RANDTSK-AVP may be of type OctetString, and may be used to carry the RANDTSK value from the AAA server to the User in two cases: (1) to indicate to the Client to use the TSK, and (2) to update the TSK. Therefore, this AVP may be used from the AAAh to the AAAv, and from the AAAv to the AAA User. The RANDTSK can be carried in a RAR, DEA, or AMA command. In the case of a TSK Update procedure, the RANDTSK preferably should be sent in a RAR command. A well defined, a priori known, specific value of the RANDTSK (TBD) allows the home network to indicate the user to start using the current TSK value without updating it as described previously. Another well defined, a priori known, specific value of the RANDTSK (TBD) allows the home network to indicate the user to stop using the current TSK.

The TSK-AVP may be of type OctetString. It may be used by the AAAh to indicate the utilization and inform of the value of the TSK to the AAAv. The TSK-AVP may carry the temporary shared key value and, therefore, must be protected (P bit set to 1). When the AAAh wants to update the TSK, it also sends the TSK-AVP to the AAAv to inform it to perform a TSK Update procedure. In such case, the TSK-AVP may carry the value of the new TSK. The TSK can be carried in a RAR, DEA, or AAAA command. In the case of a TSK Update procedure, the TSK preferably is sent in a RAR command.

The RANDNET-AVP may be of type OctetString. It may carry the challenge randomly generated by the User to authenticate the network. This RANDNET-AVP may be, therefore, sent from the AAA Client to the AAAv. It can be carried, for example, in a DER Command. In response the AAAv it should compute the AUTHNET.

The AUTHNET-AVP may be of type OctetString. It may carry the network authentication data and be sent in response to a RANDNET. The AUTHNET-AVP can thus be carried from the AAAv to the AAA Client in a DEA or RAR.

The RANDU-AVP may be of type OctetString. It may carry the challenge randomly generated by the AAAv to authenticate the User and make sure the User has updated the TSK. This RANDU-AVP may be, therefore, sent from the AAAv to the AAA client. It can be carried in a DEA or RAR, and in response the user should compute the AUTHU.

The AUTHU-AVP may be of type OctetString. It may carry the user authentication data and be sent in response to a RANDU. The AUTHU-AVP can thus be carried from the AAA Client to the AAAv in a DER command.

The AAA-Report-AVP may be of type Unsigned32. It may carry the result (failure/success) from the AAAv to the AAAh and can, therefore, be sent in a DER Command.

The AAA-Report-ack-AVP may be of type Unsigned32. This AVP may be sent from the AAAh to the AAAv and can thus be carried in a DEA command.

A temporary shared key according to the present invention is advantageous in that it enables a serving system to securely perform entity authentication and key distribution functions with the user/mobile node on behalf of the home network, but without having to involve the whole network. This saves round trips between the visited and home networks and reduces time delay and network loading. The present invention enables to provide strong network authentication such as challenge response based mechanisms without having to involve the AAAh. Further, it is optional whether a home domain and a visited domain decide to incorporate a temporary shared key as an optimization. This decision to use a TSK or not, may be based on policies and common agreements between the home domain and the visited system. A common algorithm between a user and a visited domain is all that is needed to perform authentication and key distribution using a TSK.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for delegation of security procedures to a second domain comprising:
    generating a first key for a mobile node;
    storing the first key at the mobile node and at a home domain of the mobile node;
    moving the mobile node to the second domain;
    sending a request from the second domain to the home domain to authenticate the mobile node;
    generating a second key at the home domain using the first key and a random number and sending the random number and the second key to the second domain;
    sending the random number to the mobile node by the second domain;
    generating the second key by the mobile node using the random number and the first key; and
    using the second key for at least one authentication procedure between the mobile node and the second domain.

2. The method of claim 1, wherein the second domain is a visited domain.

3. The method according to claim 1, wherein the authentication procedure is a key derivation procedure.

4. The method according to claim 3, wherein the key derivation procedure comprises generating at least one session key using the second key.

5. The method according to claim 1, wherein the authentication procedures comprise authentication of the mobile node by the second domain.

6. The method according to claim 1, wherein the authentication procedures comprise authentication of the second domain by the mobile node.

7. The method according to claim 1, wherein the authentication procedures comprise control by the second domain of key distribution between the mobile node and entities in the second domain.

8. The method according to claim 1, wherein the authentication procedures comprise ciphering and integrity protection of messages between the mobile node and an entity in the second domain.

9. The method according to claim 1, wherein the authentication procedures comprise distribution of dynamic keys between the mobile node and entities in the second domain based on a local security association.

10. The method according to claim 1, further comprising generating the second key at the home domain using the first key and the random number as inputs to an algorithm.

11. The method according to claim 1, further comprising sending the random number and the second key to the second domain across a secure channel.

12. The method according to claim 1, wherein the home domain comprises an Authentication Authorization and Accounting (AAA) server.

13. The method according to claim 1, wherein the second domain includes an Authentication Authorization and Accounting (AAA) server.

14. The method according to claim 13, further comprising communicating with the mobile node by the AAA server through an AAA client.

15. The method according to claim 14, wherein the AAA client comprises one of an attendant located in a router, a Registration Agent, and a server located in the second domain.

16. The method according to claim 14, further comprising sending the random number and the second key to one of the AAA server and the AAA client.

17. The method according to claim 1, wherein the second key is a temporary shared key (TSK).

18. The method according to claim 1, further comprising:
    generating a second random number at the home domain;
    generating a third key at the home domain using the first key and the second random number, and sending the second random number and the third key to the second domain; and
    sending the second random number to the mobile node by the second domain.

19. The method according to claim 18, wherein the generating the third key is based on home domain policies.

20. The method according to claim 18, further comprising updating the second key with the third key in the mobile node.

21. The method according to claim 18, further comprising:
    generating a network authentication request by the mobile node and sending the network authentication request to the second domain;

generating a first authentication response by the second domain using the third key and the network authentication request and sending the network authentication response to the mobile node;

generating the third key by the mobile node using the first key and the second random number;

generating a second authentication response by the mobile node using the third key and the network authentication request;

comparing the second domain generated first authentication response with the mobile node generated second authentication response, authenticating the second domain by the mobile node if the second authentication response and the first authentication response compare, and indicating to the second domain that the second key has been updated with the third key if the first authentication response and second authentication response compare; and using the third key by the second domain for the authentication procedures between the mobile node and the second domain.

22. The method according to claim 21, further comprising sending a report to the second domain that the second key has been updated.

23. The method according to claim 18, wherein the third key is a temporary shared key (TSK).

24. The method according to claim 20, further comprising:

generating a third random number by the second domain and sending the third random number to the mobile node;

generating second authentication data by the mobile node using the third random number and the third key and sending the second authentication data to the second domain; and using the second authentication data by the second domain to verify that the mobile node has updated the second key with the third key.

25. The method according to claim 24, further comprising sending a report to the home domain that the second key has been replaced with the third key.

26. The method according to claim 1, further comprising:

using the second key to generate first authentication data by the mobile node;

generating a host challenge to authenticate the home domain and sending the first authentication data, the host challenge, and a mobile node identity from the mobile node to the second domain;

sending the first authentication data, the host challenge and the mobile node identity from the second domain to the home domain;

generating second authentication data, using the host challenge and the first key, at the home domain;

sending the second authentication data from the home domain to the second domain, the second domain forwarding the second authentication data to the mobile node; and using the second authentication data to verify the home domain by the mobile node.

27. A method for delegation of security procedures to a second domain comprising:

sharing a first key with a mobile node and at least one server in the home domain of the mobile node;

moving the mobile node into the second domain;

requesting authentication of the mobile node by the home domain;

generating a second key using the first key in the home domain;

sending the second key to the second domain; and using the second key for at least one authentication procedure between the mobile node and the second domain.

28. The method according to claim 27, wherein the second domain is a visited domain.

29. A system for delegation of security procedures to a visited domain comprising:

a home domain, the home domain containing at least one server;

a mobile device, the mobile device sharing a first key with one at least one server in the home domain; and a second domain, the second domain containing at least one second server, a security association existing between the one at least one server in the home domain and one at least one second server in the second domain, wherein when the mobile device roams into the second domain, the second domain requests authentication of the mobile device by the home domain, the one at least one server generating a second key using the first key and sending the second key to the second domain, the second key being used for at least one authentication procedure between the mobile device and the second domain.

30. The system according to claim 29, wherein the one at least one server comprises an Authentication Authorization and Accounting (AAA) server.

31. The system according to claim 29, wherein the one at least one second server comprises an Authentication Authorization and Accounting (AAA) server.

32. The system according to claim 29, wherein the mobile device comprises a mobile phone.

33. The system according to claim 29, wherein the second key is a temporary shared key (TSK).

34. The system according to claim 29, wherein the key derivation procedures comprise generating at least one session key using the second key.

35. The system according to claim 29, wherein the authentication procedures comprise authentication of the mobile device by the second domain.

36. The system according to claim 29, wherein the authentication procedures comprise authentication of the second domain by the mobile device.

37. The system according to claim 29, wherein the authentication procedures comprise control by the second domain of key distribution between the mobile device and entities in the second domain.

38. The system according to claim 29, wherein the authentication procedures comprise ciphering and integrity protection of messages between the mobile device and an entity in the second domain.

39. The system according to claim 29, wherein the authentication procedures comprise distribution of dynamic keys between the mobile device and entities in the second domain based on a local security association.

40. A method for delegation of security procedures to a second domain comprising:

moving a mobile device to the second domain, the mobile node having a home domain;

sending a second key from the home domain to the second domain for authentication of the mobile device, the second key being based on a first key shared between the home domain and the mobile device; and authenticating the mobile device by the second domain using the second key, wherein the second key is used for at least one of authentication procedures and key derivation procedures between the mobile device and the second domain.

41. The method according to claim 40, further comprising moving a mobile node comprising a mobile phone to the second domain.

42. The method according to claim 40, further comprising generating a session key at the second domain using the second key.

43. The method according to claim 40, further comprising:

sending a third key from the home domain to the second domain, the third key being based on the first key;

authenticating the second domain by the mobile device using the third key; and updating the second key with the third key at the mobile device, wherein the third key is used for the authentication procedures and the key derivation procedures between the mobile device and the second domain.

44. The method according to claim 40, wherein the second domain is a visited domain.

* * * * *